United States Patent
Peng et al.

(10) Patent No.: US 10,386,518 B2
(45) Date of Patent: Aug. 20, 2019

(54) DEVICE AND METHOD FOR DEBLENDING SIMULTANEOUS SHOOTING DATA USING AN ITERATIVE APPROACH

(71) Applicant: CGG SERVICES SA, Massy (FR)

(72) Inventors: Chao Peng, Sugar Land, TX (US); Bin Liu, Sugar Land, TX (US); Adel Khalil, Aberdeen (GB); Gordon Poole, East Grinstead (GB)

(73) Assignee: CGG SERVICES SAS, Massy (FR)

( * ) Notice: Subject to any disclaimer, the term of this patent is extended or adjusted under 35 U.S.C. 154(b) by 1168 days.

(21) Appl. No.: 14/682,361

(22) Filed: Apr. 9, 2015

(65) Prior Publication Data
US 2015/0293249 A1    Oct. 15, 2015

Related U.S. Application Data (60) Provisional application No. 61/977,635, filed on Apr. 10, 2014.

(51) Int. Cl.
*G01V 1/36*    (2006.01)

(52) U.S. Cl.
CPC ........ *G01V 1/364* (2013.01); *G01V 2210/127* (2013.01); *G01V 2210/324* (2013.01); *G01V 2210/3248* (2013.01)

(58) Field of Classification Search
CPC ............ G01V 1/364; G01V 2210/127; G01V 2210/324; G01V 2210/3248
USPC ....................................................... 702/16
See application file for complete search history.

(56) References Cited

U.S. PATENT DOCUMENTS

| | | | | |
|---|---|---|---|---|
| 2011/0141849 | A1* | 6/2011 | Brittan | G01V 1/364 367/43 |
| 2012/0044782 | A1* | 2/2012 | Bekara | G01V 1/364 367/24 |
| 2014/0355379 | A1* | 12/2014 | Moldoveanu | G01V 1/3843 367/15 |

OTHER PUBLICATIONS

Mahdad, Deblending of seismic data, 2012.*
R.L. Abma et al., "High Quality Separation of Simultaneous Sources by Sparse Inversion", 72nd EAGE Conference & Exhibition incorporating SPE EUROPEC 2010, Jun. 14-17, 2010, Barcelona, Spain, B003.
C. Beasley et al., "A 3D Simultaneous Source field Test Processed by Active Separation", 73rd EAGE Conference & Exhibition incorporating SPE EUROPEC 2011, May 23-26, 2011, Vienna, Austria, H030.

(Continued)

*Primary Examiner* — Michael P Nghiem
*Assistant Examiner* — Dacthang P Ngo
(74) *Attorney, Agent, or Firm* — Patent Portfolio Builders PLLC (57) ABSTRACT

A device, medium and method for deblending seismic data associated with a subsurface of the earth. The method includes a step of receiving seismic data S recorded with one or more seismic receivers, wherein the seismic data S includes shot recordings generated by first and second source arrays that are simultaneously actuated; a step of detecting incoherent energy of the seismic data S using a median filter; a step of replacing incoherent parts of the seismic data with a projection filter to obtain deblended data for one of the two or more source arrays; and a step of generating in a computing device an image of the subsurface based on the deblended data.

20 Claims, 9 Drawing Sheets

(56) References Cited

OTHER PUBLICATIONS

A. Mahdad et al., "Iterative Method for the Separation of Blended Seismic Data: Discussion on the Algorithmic Aspects", EAGE, Geophysical Prospecting, Mar. 2012, pp. 782-801, vol. 60.
I. Moore, "Simultaneous Sources—Processing and Applications", 72nd EAGE Conference & Exhibition incorporating SPE EUROPEC 2010, Jun. 14-17, 2010, Barcelona, Spain, B001.
R. Soubaras, "Prestack Random and Impulsive Noise Attenuation by f-x Projection Filtering", 65th Annual International Meeting, SEG, Expanded Abstracts, 1995.

\* cited by examiner

DEVICE AND METHOD FOR DEBLENDING SIMULTANEOUS SHOOTING DATA USING AN ITERATIVE APPROACH

CROSS REFERENCE TO RELATED APPLICATIONS

The present application claims the benefit of priority under 35 U.S.C. § 119(e) to U.S. Provisional Application No. 61/977,635 filed on Apr. 10, 2014, the entire contents of which is hereby incorporated by reference.

BACKGROUND

Technical Field

Embodiments of the subject matter disclosed herein generally relate to methods and systems for generating, acquiring and processing seismic data and, more particularly, to mechanisms and techniques for separating seismic data simultaneously shot by two or more seismic sources.

Discussion of the Background

Seismic data acquisition and processing may be used to generate a profile (image) of geophysical structures under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where the oil and gas reservoirs are located.

In the past, conventional land seismic acquisition generally employed multiple vibrators (seismic sources) acting one at a time. In land-based operations, the vibrators are positioned at a source location and then actuated. Once activated, the vibrators generate a sweep that typically lasts between five and twenty seconds and typically spans a predetermined range of frequencies. A recording system that is connected to a plurality of receivers, typically geophones for land-based seismic exploration, is employed to receive and record the response data. For reflection seismology, the record length is typically set to equal the sweep length plus a listening time equal to the two-way travel time of the deepest structure of interest, which is the time required for the seismic energy to propagate from the source through the earth to the deepest reflector of interest and back to the receiver. The vibrators are then moved to a new source location and the process is repeated.

Figure 1:
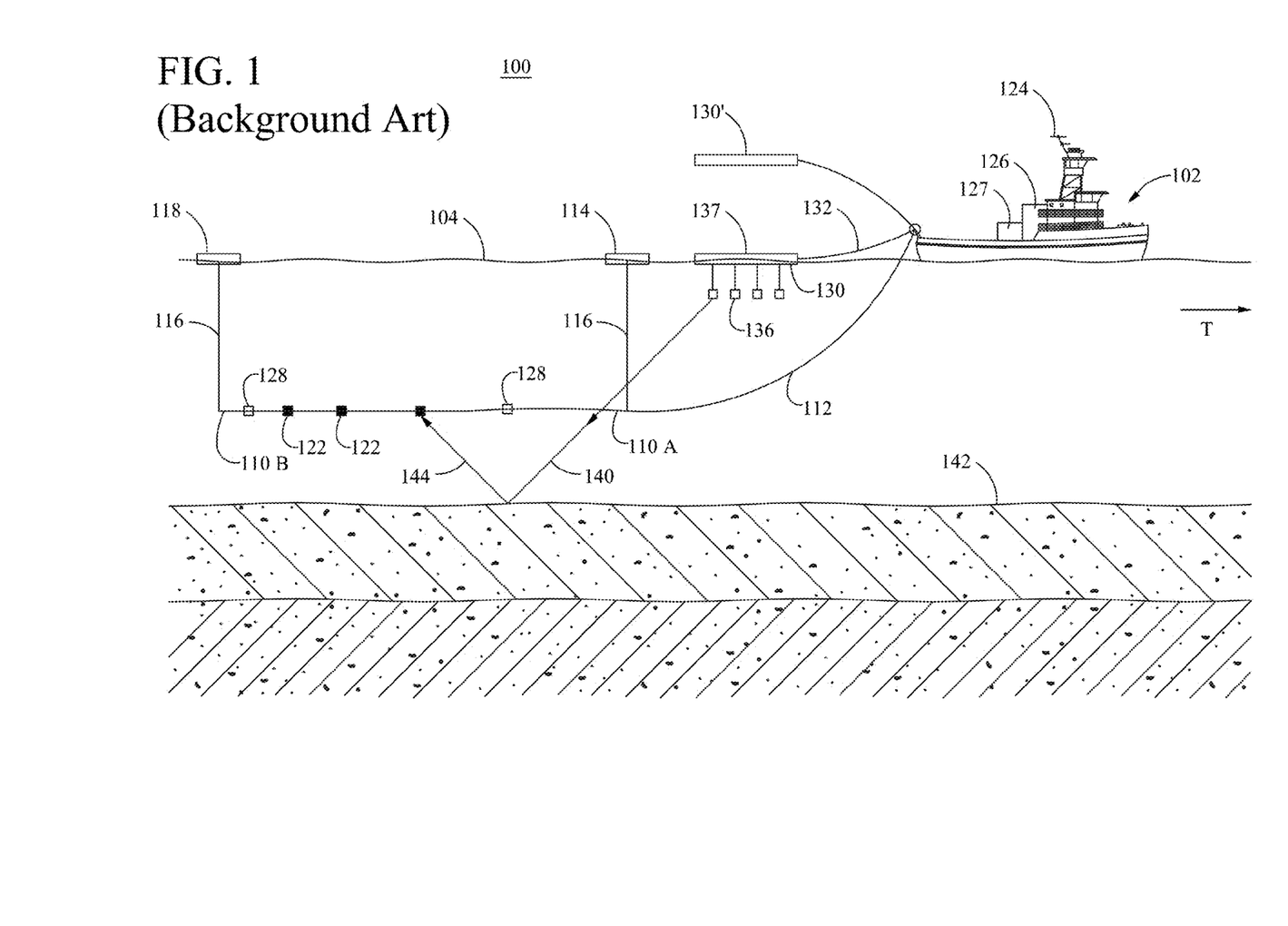
FIG. 1 illustrates a marine seismic survey system.

For marine, a seismic acquisition system 100 includes, as illustrated in FIG. 1, a vessel 102 that tows plural streamers 110 (only one is visible in the figure) and a seismic source array 130. Streamer 110 is attached through a lead-in cable (or other cables) 112 to vessel 102, while source array 130 is attached through an umbilical 132 to the vessel. A head float 114, which floats at the water surface 104, is connected through a cable 116 to the head end 110A of streamer 110, while a tail buoy 118 is connected, through a similar cable 116, to the tail end 110B of streamer 110. Head float 114 and tail buoy 118 are used, among other things, to maintain the streamer's depth. Seismic sensors 122 are distributed along the streamer and configured to record seismic data. Seismic sensors 122 may include a hydrophone, geophone, accelerometer or a combination thereof. Positioning devices 128 are attached along the streamer and controlled by a controller 126 for adjusting a position of the streamer according to a survey plan.

Source array 130 has plural source elements 136, which are typically air guns. The source elements are attached to a float 137 to travel at desired depths below the water surface 104. The source elements attached to float 137 form a sub-array. Source array 130 may have multiple sub-arrays, typically 3. Traditionally, vessel 102 tows two source arrays 130 and 130', which may be identical. During operation, vessel 102 follows a predetermined path T while source elements (usually air guns) 136 emit seismic waves 140. These waves bounce off the ocean bottom 142 and other layer interfaces below the ocean bottom 142 and propagate as reflected/refracted waves 144, which are recorded by sensors 122. The positions of both source elements 136 and recording sensors 122 may be estimated based on GPS systems 124 and recorded together with the seismic data in a storage device 127 onboard the vessel. Controller 126 has access to the seismic data and may be used to achieve quality control or even fully process the data. Controller 126 may also be connected to the vessel's navigation system and other elements of the seismic survey system, e.g., positioning devices 128.

When the source (either land source or marine source) is fired with standard data acquisition, the subsequent recording time is defined so that all useful reflected/diffracted energy is recorded before the next shot fires. This delay time imposes constraints on the acquisition rate and, hence, increases the cost and length of the acquisition process.

To reduce the acquisition time, it is possible to simultaneously shoot the sources. Acquisition of simultaneous source data means that the signals from two or more sources interfere at least for part of the record, one source is shot during the listening time of another source so that a same seismic receiver receives during that listening time information corresponding to both sources. By acquiring data in this way, the time taken to shoot a dataset is reduced along with the acquisition costs. As an alternative to reducing the acquisition time, a higher density dataset may be acquired in the same time. For such data to be useful, it is necessary to develop processing algorithms to handle source interference (cross-talk noise).

Source interference appears because subsurface reflections from an early source excitation may be comingled with those that have been sourced later, i.e., a "blended source" survey is acquired. Note that this is in contrast to conventional surveying techniques, wherein the returning subsurface reflections from one source are not allowed to overlap with the reflections of another source. Although the blended-source approach has the potential to reduce the time in the field, thereby proportionally reducing the cost of the survey, one problem is that it can be difficult to separate the individual shots thereafter. In other words, what is needed in interpreting seismic data is the depth of each reflector, and the depth of a reflector is determined by reference to its two-way seismic travel time. Thus, in a multiple-source survey it is the goal to determine which of the observed subsurface reflections is associated with each source, i.e., to deblend the data; otherwise, its two-wave travel time cannot be reliably determined.

Thus, for such a gather, it is necessary to separate the energy associated with each source (deblend) as a preprocessing step, and then to proceed with conventional processing. To make the separation easier, it is generally advantageous to use a variety of different source signals, for example, different vibroseis sweeps or pseudo-random sweeps. When energy from a given source is correlated with the sweep signal, this result is a focusing of the energy of that source while keeping energy from other sources dispersed. The actual timing of the shots may also be used to successfully deblend the energy from the sources. However, the existing methods experience various limitations and/or shortcomings as for example, crosstalk among shots, i.e., the interfering noise. An improvement of the final image in simultaneous source acquisition greatly depends on the deblending quality of the used method.

Thus, there is a need to develop a method capable of processing blended seismic data while not being limited as noted above.

SUMMARY OF THE INVENTION

According to an exemplary embodiment, there is a method for deblending seismic data associated with a subsurface of the earth. The method includes a step of receiving seismic data S recorded with one or more seismic receivers, wherein the seismic data S includes shot recordings generated by first and second source arrays that are simultaneously actuated; a step of detecting incoherent energy of the seismic data S using a median filter; a step of replacing incoherent parts of the seismic data with a projection filter to obtain deblended data for one of the two or more source arrays; and a step of generating in a computing device an image of the subsurface based on the deblended data.

According to another exemplary embodiment, there is a computing device for deblending seismic data associated with a subsurface of the earth. The computing device includes an interface to receive seismic data S recorded with one or more seismic receivers, wherein the seismic data S includes shot recordings generated by first and second source arrays that are simultaneously actuated; and a processor connected to the interface. The processor is configured to detect incoherent energy of the seismic data S using a median filter, replace incoherent parts of the seismic data with a projection filter to obtain deblended data for one of the two or more source arrays, and generate an image of the subsurface based on the deblended data.

According to still another exemplary embodiment, there is a computer readable medium including computer executable instructions, wherein the instructions, when executed by a processor, implement instructions for deblending seismic data associated with a subsurface of the earth. The instructions implement the method steps discussed above.

BRIEF DESCRIPTION OF THE DRAWINGS

For a more complete understanding of the present invention, reference is now made to the following descriptions taken in conjunction with the accompanying drawings, in which:

FIGS. 7B and 7E shows how the signal-to-noise ratio is decreased with additional source arrays firing at the same time, while

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a common channel domain applied to marine seismic data. However, the embodiments to be discussed next are not limited to such domain and/or marine seismic data, but may be applied to other domains.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for deblending seismic data acquired by simultaneous shooting. In one application, the method includes a step of receiving seismic data S recorded with one or more seismic receivers, wherein the seismic data S includes shot recordings generated by first and second source arrays that are simultaneously actuated, a step of detecting incoherent energy of the seismic data S using a median filter, a step of replacing the incoherent parts of the seismic data with a projection filter to obtain deblended data for one of the two or more source arrays, and a step of generating in a computing device an image of the subsurface based on the deblended data.

As discussed in the background section, simultaneous sources have high potential for reducing the cost of acquisition, especially for data sets with wide/full azimuth and long offset coverage. Alternatively, with similar cost as conventional acquisition, they have the potential to improve the quality of the image with denser shot spacing resulting in better signal-to-noise ratios.

An iterative approach with a hybrid filter that combines a median filter and an f-x projection filter to separate the simultaneous source data is applied in one embodiment. This approach is then applied to seismic data actually acquired with a variable-depth streamer narrow azimuth (NAZ) survey. A benefit of this simulation study is that the actual unblended data is known, so a true estimate of the effectiveness of the new method can be evaluated. The separation results discussed with regard to FIGS. 3A-D and 5A-7F show very little leakage even in complex areas while preserving the AVO response.

Prior to discussing the deblending algorithm in more detail, it is believed to be in order to provide some clarifications regarding the concept of "simultaneous source" shooting. The simultaneous source shooting is used in the art to describe at least two scenarios: (1) when two or more source arrays are shot at the same instant in time, and (2) when the two or more source arrays are shot almost simultaneously, i.e., with a small time delay one relative to the other. An example of such almost simultaneous shooting is when source array 1 is shot at time $t_0$ and source array 2 is shot at time $t_0+\Delta t$, where $\Delta t$ is a small time. In one application, $\Delta t$ is smaller than 5 ms. However, there are instances in the industry when $\Delta t$ being smaller than 2 s is still considered to fall under the definition of "simultaneous shooting." Alternatively to an acquisition scheme where a first source is fired with random timing relative to a second source, the two sources may operate independently. In this case, vessel speeds, line change times, and/or other factors provide a randomness to the shooting times. Thus, interference noise may arrive at any point during the listening time. There may also be time durations where only one source is firing.

Thus, the term "simultaneous shooting" includes not only shootings at exactly the same time but also (1) shootings almost at the same time, with the time difference $\Delta t$ being in the range of zero to couple of seconds or (2) independent shooting of two different source arrays such that the shooting of one source array is perceived as noise for the streamers associated with the other source array. The upper border of the time difference $\Delta t$ for the first type of shooting may be related to the specifics of the survey. For example, suppose that a source array shoots at time $t_0$ and the geological feature of interest being surveyed is at a certain depth. If the shortest travel time of the wavelet generated by the source array, which is reflected from any layer in the underground, and recorded by a seismic receiver is 15 s, then the upper border of the time difference $\Delta t$ is 15 s.

Separation of dithered simultaneous source data is often based on an iterative flow that utilizes coherence criteria in an appropriate transform domain. This traditional approach was disclosed, for example, by Abma et. al., 2010, "High quality separation of simultaneous sources by sparse inversion," $72^{nd}$ EAGE meeting, Barcelona, Spain; I. Moore, 2010, "Simultaneous Sources—Processing and applications," $72^{nd}$ EAGE meeting, Barcelona, Spain; Beasley et. al., 2011, "A 3D simultaneous source field test processed by active separation," $73^{rd}$ EAGE meeting, Vienna, Austria; and Mandad et al., 2012, "Iterative method for the separation of blended seismic data: discussion on the algorithmic aspects," Geophysical prospecting."

The novel separation method described herein applies a median filter in the f-x domain to detect the incoherent interference signal and then replaces the detected incoherent interference signal with a better frequency component obtained, for example, from neighboring traces using an f-x projection filter (see, for example, R. Soubaras, 1995, "Prestack random and impulsive noise attenuation by f-x projection filtering," $65^{th}$ Ann. Internat. Mtg, Soc, Expl. Geophys., Expanded Abstract, 525-527 describing a hybrid filter). This hybrid filter is repeatedly used in an iterative process (to be discussed next), which further reduces the crosstalk among different source arrays.

Figure 2:
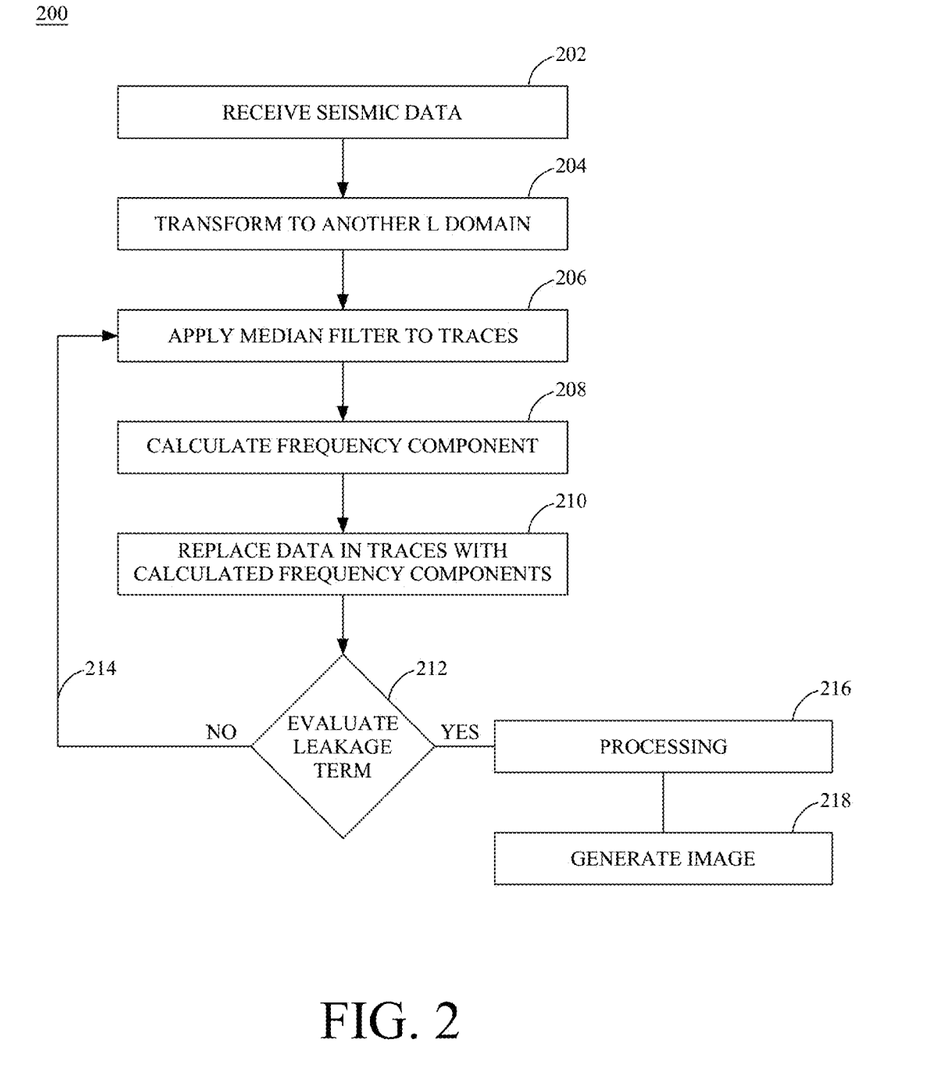
FIG. 2 is a flowchart of a method for deblending seismic data.

According to an embodiment illustrated in FIG. 2, a deblending method 200 includes a step 202 of receiving seismic data S recorded with seismic receivers. Seismic data d is blended, i.e., it includes data from at least the first and second source arrays. The seismic receivers may be any known type, for example, hydrophones, geophones, accelerometers, optical sensors, and any combination thereof. The streamers carrying these seismic receivers may be horizontal, slanted, curved, etc. The recorded seismic waves are generated by two or more source arrays that shoot simultaneously as discussed above.

In step 204, the recorded seismic data S, which is recorded in the time-space domain, may be transformed to another domain, for example, the frequency-space (f-x) domain to obtain transformed seismic data d. Note that the seismic data S includes unblended seismic data from the first source and unblended seismic data from the second source.

In step 206, a median filter in the f-x domain is applied to the seismic data. The median filter is applied across a number of traces to determine which traces are heavily affected by cross-talk noise, for example, trace by trace with a spatial and time window centering at a given trace. For example, a window having a certain size is selected and moved along a given trace. The window may extend to cover multiple traces. For each window position, amplitudes of the given trace are evaluated within the window and a median amplitude value is calculated using the median filter. If the median amplitude value for the given trace is larger than a given threshold value, that portion of the given trace is removed. Thus, in this step, if the seismic data from the first source array is sought, the median filter detects incoherent interference signals coming from the second source array and removes it.

In step 208, the method calculates/predicts a better frequency component for the removed data, for example, by using an f-x projection filter as described above in Soubaras. This f-x projection filter generates new seismic data based on neighboring traces, for example, using interpolation. In one application, the method applies the projection filter to obtain predicted seismic data for the portion of the given trace and then replaces the portion of the given trace with the predicted seismic data to obtain the deblended data for one of the source arrays. In this way, the seismic data removed in step 206 from various traces is replaced in step 210 by the new predicted data calculated in step 208.

In step 212, a leakage energy term is evaluated, and if it is larger than a given threshold, the process returns in step 214 to step 206 to perform a new iteration of the algorithm explained above. However, if the result of the estimation step 212 is positive, i.e., the leakage term energy it is smaller than the given threshold, the process advances to step 216, where traditional processing steps are applied (to be discussed later with regard to FIG. 9) and in step 218 the deblended data is used to generate an image of the surveyed subsurface.

In one embodiment, some mathematical details of the steps discussed above are now presented. Consider that $g_1$ is unblended seismic source data corresponding to source array 1 and $g_2$ is the unblended seismic source data corresponding to source array 2. Also consider that $\Delta g_1$ and $\Delta g_1$ are the residual energies for source arrays 1 and 2, respectfully. A residual energy is defined as any energy (e.g., random energy) in addition to the coherent energy generated by a given source array. For a given iteration n, the deblended energy corresponding to source array 1 is considered to be $I_n$. Note that the same process can be applied to source array 2 for deblending the seismic data.

The median and the projection filters discussed above may be implemented, in one embodiment, as impulsive noise attenuation operator. The operator may be described by filters $F_i$ and $F_i^T$, which output a remaining energy and impulsive noise removed parts of the $i^{th}$ source, respectively. The remaining energy is the difference between the input energy of the seismic data and the impulsive noise removed parts. In one application, filter $F_i$ is configured to transform the seismic data S from the t-x domain in the f-x domain, for example with a Fourier transform, separate the coherent energy in the f-x domain, and then transform back to the t-x domain the separated coherent energy. The same is true for the $F_i^T$ filter. Thus, filters $F_i$ and $F_i^T$ are applied on seismic data S in the time-space domain and they output corresponding energies in the time-space domain, after performing various mathematical operations in the f-x domain. Those skilled in the art would understand that another domain than the f-x domain may be used.

These domains should not be confused with the fact that the seismic data S is also in the common channel domain. The common channel domain refers to a gather of traces which belong to the same recording channel (hydrophone/geophone receiver). Adjacent traces in the common channel domain would be traces from consecutive shots recorded with the same seismic receiver. Those skilled in the art would appreciate that other domains may be used for expressing seismic data S.

Returning to the seismic data S, it is given in the common channel domain by:

$$S = g_1 + g_2, \tag{1}$$

and the deblended seismic data $I_1$ for the source array i=1, after the first iteration n=1, is given by:

$$I_1 = F_1 S = g_1 - \Delta g_1 + o(\Delta g_2). \tag{2}$$

In equation (2), symbol o indicates that the term to which the symbol is attached is smaller than the term inside the brackets. In other words, the term $o(\Delta g_2)$ indicates that its value is smaller than $\Delta g_2$. This means, that after the first iteration, only some energy $\Delta g_2$ associated with the second source array is left. Note that the term $o(\Delta g_2)$ is present in equation (2) because the filter $F_1$ could not fully remove impulsive energy associated with the second source array 2 that is present in S.

During the first iteration step, it is also possible to calculate the impulsive noise removed parts in S relative to the source array 1, i.e., the complementary of the remaining energy calculated in equation (2). The impulsive noise removed parts in S relative to the source array 1 is given by equation (3):

$$F_1^T S = g_2 + \Delta g_1 - o(\Delta g_2) \tag{3}$$

Equation (3) is calculated by subtracting from the total seismic data S (i.e., equation (1)), the remaining energy seismic data with regard to the source array 1 (i.e., equation (2)). The separation quality of this iteration depends on the leakage term $-\Delta g_1 + o(\Delta g_2)$ and for this reason, a threshold (which depends from the survey to survey) T is selected depending on the characteristics of the survey. Those skilled in the art would appreciate that in practice, unblended data $g_1$ from source array 1 and unblended data $g_2$ from source array 2 also include incoherent energy. Thus, when applying the filter $F_i$ to the unblended seismic data of each source array, the following relationships hold:

$$F_1 g_1 = g_1 - \Delta g_1, \text{ and} \tag{4}$$

$$F_2 g_2 = g_2 - \Delta g_2. \tag{5}$$

Equations (4) and (5) indicate that each of unblended seismic data sets $g_1$ and $g_2$ include some residual energy that is incoherent/impulsive. Based on equations (1), (4) and (5), it can be seen that equation (6) holds:

$$F_1 S + F_2 S \neq S. \tag{6}$$

For the next iteration (i.e., step 214) in the process described above with regard to FIG. 2, equation (7) calculates a residual incoherent energy as follows:

$$F_2^T (F_1^T S) = F_2^T (g_2 + \Delta g_1 - o(\Delta g_2)) = (\Delta g_1)' + (\Delta g_2)'. \tag{7}$$

where the terms with prime indicate small incoherent energy which may be smaller, larger, or equal to corresponding residual energies $\Delta g_1$ and $\Delta g_2$. By adding together equations (2) and (7), the second iterative step generates the deblended seismic data $I_2$ for the source array 1, which is given by:

$$I_2 = F_1 S + F_2^T (F_1^T S) = g_1 - o(\Delta g_1)' + (\Delta g_2)'. \tag{8}$$

Note that the residual energy $o(\Delta g_1)'$ term for source array 1 in the second iteration (equation (8)) is smaller than the residual energy $\Delta g_1$ term from the first iteration (equation (2)).

The leakage term for the second iteration (equation (8)) is now $-o(\Delta g_1)' + (\Delta g_2)'$. As the number of iterations for method 200 increases, the leakage energy is gradually reduced until it converges to a limit (threshold) where the result is no longer improved. The inventors have observed that the leakage energy oscillates during the iterative process, i.e., even iterations tend to preserve the energy relating to the aligned source, while odd iterations are more likely to suppress interfering noise (the other source). The aligned energy or aligned source means that the traces are time aligned based on the firing time for one of the sources. Based on this observation, in one embodiment, the algorithm is stopped at an even number of iterations to favor aligned energy preservation and allow the migration and stacking processes to help reduce the remainder of the cross-talk.

The above discussed algorithm has been tested on real field data recorded with a variable-depth streamer narrow azimuth (NAZ) survey acquired with two source arrays fired sequentially. The data sampling rate is 2 ms and the shot interval is 50 m for each source array. The shot gathers from each source array are first interpolated to 25 m shot spacing individually. The interpolated data for source array 2 is shifted by a random dithering time (max ±1,000 ms) and then summed with source array 1 data to simulate a simultaneous source acquisition.

Figure 3A:
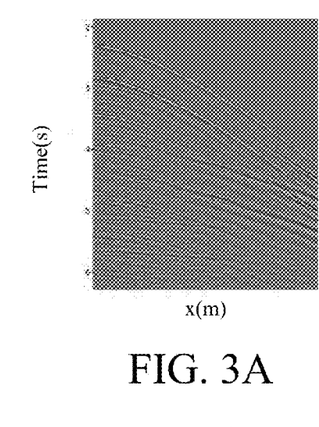
FIG. 3A illustrate blended data, FIG. 3B deblended data according to the method illustrated in FIG. 2, FIG. 3C illustrate the true unblended source data.
Figure 3B:
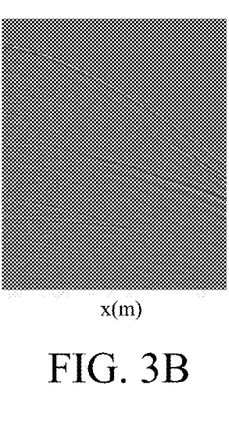
Figure 3C:
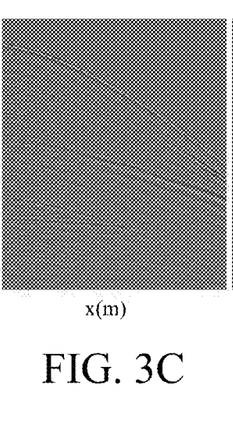
Figure 3D:
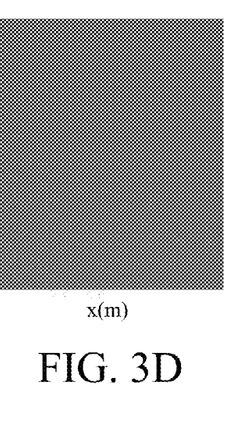
FIG. 3D shows the difference between the deblended data of FIG. 3B and the measured unblended shot data of FIG. 3C.

FIG. 3A shows a blended shot record (traces recorded in time (Y-axis) for various seismic receives (position on X-axis)) obtained based on the methodology disclosed in the above paragraph. FIG. 3B illustrates the deblended shot record of source array 1 after applying six iterations of the process discussed with regard to FIG. 2 (using equations (2) and (8) for the first two iterations). FIG. 3C illustrates the true unblended source array 1 shot, which was in fact measured as the actual seismic survey did not use simultaneous shooting. FIG. 3D shows the difference between the deblended data (FIG. 3B) and the measured unblended shot data (FIG. 3C). Those skilled in the art would observe the minor differences between the deblended and unblended shots, which confirm that the separation flow described in FIG. 2 works effectively. Also, it is observed that the process of FIG. 2 handles equally well both near and far channels, which is a challenge for the traditional methods.

Figure 4A:
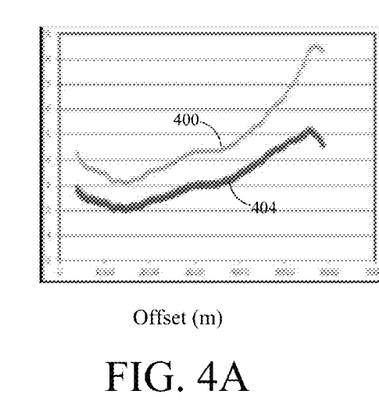
FIGS. 4A-B display amplitude versus offset curves for blended, deblended and unblended CDP gathers for two different time windows.
Figure 4B:
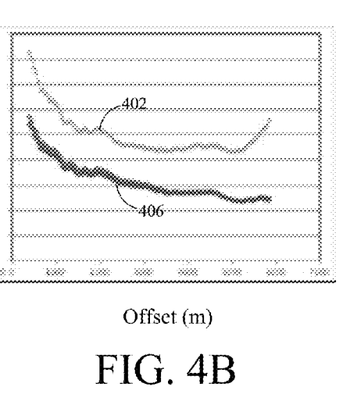

FIGS. 4A-B display amplitude versus offset (AVO) curves for blended, deblended and unblended CDP gathers for two different time windows. FIG. 4A shows AVO curve 400 for blended seismic data and AVO curve 404 for unblended seismic data while FIG. 4B shows AVO curve 402 for deblended seismic data and AVO curve 406 for unblended seismic data. The resemblance between the unblended and deblended curves indicates that the separation approach discussed with regard to FIG. 2 preserves the AVO characteristics of the seismic data.

Figure 5A:
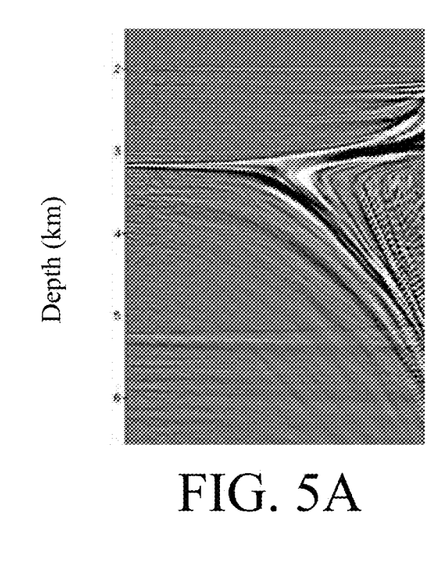
FIGS. 5A-C illustrate the common image gathers migrated with Kirchhoff migration for blended (FIG. 5A), deblended (FIG. 5B) and unblended (FIG. 5C) data.
Figure 5B:
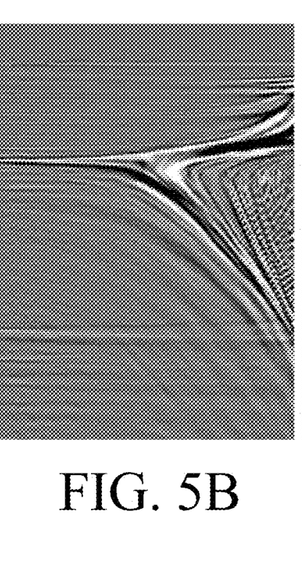
Figure 5C:
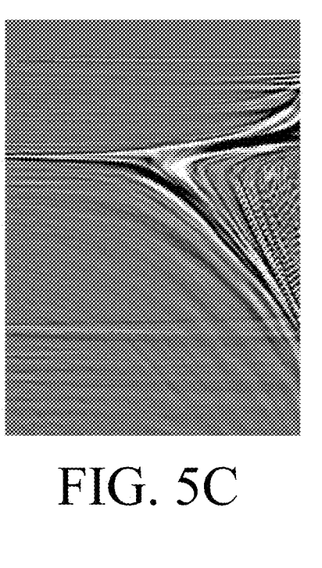

Crosstalk can be greatly eliminated by stacking, especially for wide/full azimuth surveys with higher folds. To investigate the evidence of crosstalk prior to stacking, the residual crosstalk is examined now after deblending on common image gathers. FIGS. 5A-C compare the common image gathers (CIG) migrated with Kirchhoff migration for blended (FIG. 5A), deblended (FIG. 5B) and unblended (FIG. 5C) data. The result of this comparison indicates that the quality of separation is adequate for curvature analysis in the sediment tomography update.

The separation results illustrated in FIGS. 3A to 5C show that the deblending flow is robust and effective. The ability to handle near and far channels equally well makes this method a valuable tool to separate the blended data for the purpose of pre-processing, velocity model building, final product imaging and AVO analysis. One challenge for the current separation method is the existence of spatial aliasing in the acquired data, e.g., when shots are coarsely sampled. A solution would be to improve shot sampling by firing multiple source arrays simultaneously. However, by firing multiple source arrays simultaneously, it impacts the separation due to more severe cross-talk among source arrays.

Figure 6A:
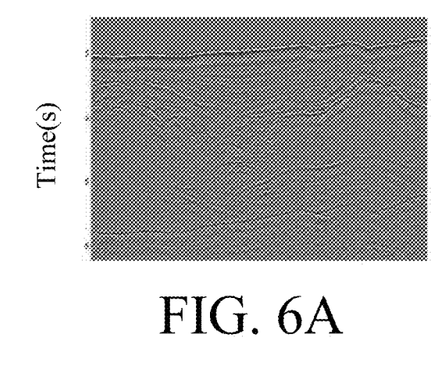
FIG. 6A shows a deblended common channel with 25 m shot spacing.
Figure 6B:
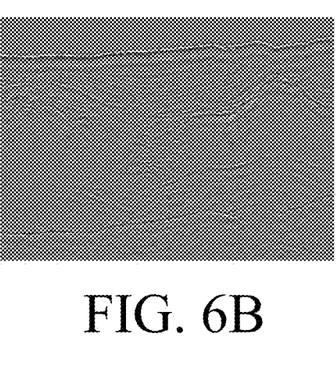
FIG. 6B shows deblended common channel with 50 m shot spacing and FIG. 6C shows deblended common channel with 100 m shot spacing.
Figure 6C:
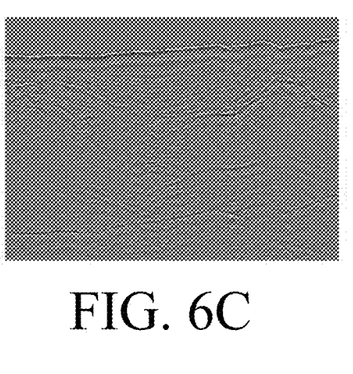
Figure 6D:
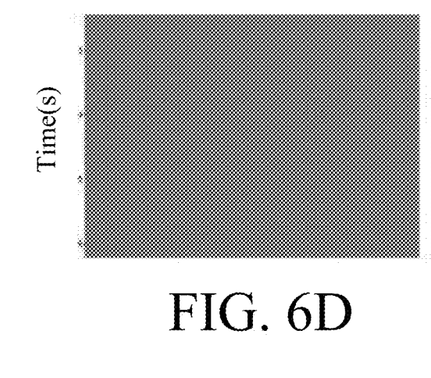
FIG. 6D shows the difference between deblended data and unblended data for the 25 m shot spacing.
Figure 6E:
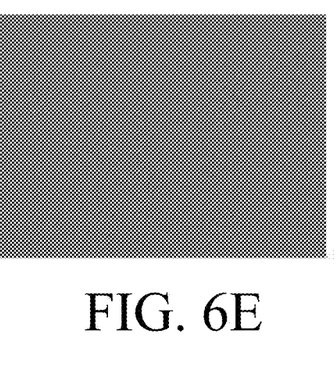
FIG. 6E shows the same for the 50 m shot spacing and FIG. 6F shows the same for the 100 m shot spacing.
Figure 6F:
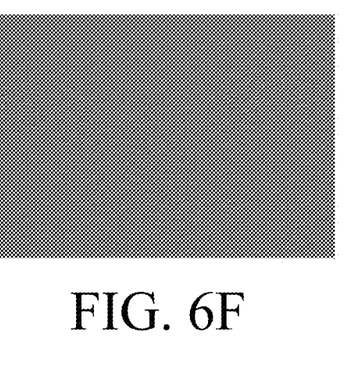

The influence of shot sampling on the deblended seismic data is now investigated. Blended data with 50 m and 100 m shot spacing is generated by decimating every other shot. FIG. 6A shows a deblended common channel with 25 m shot spacing, FIG. 6B shows deblended common channel with 50 m shot spacing and FIG. 6C shows deblended common channel with 100 m shot spacing. FIG. 6D shows the difference between deblended data and unblended data for the 25 m shot spacing, FIG. 6E shows the same for the 50 m shot spacing and FIG. 6F shows the same for the 100 m shot spacing.

What is observed is that for 25 m shot spacing as illustrated in FIG. 6A, even aliased areas, e.g. diffracted energies involving very steep dips, are well-separated. However, as shot spacing increases as illustrated in FIGS. 6B and 6C, the separation quality degrades, especially in the severely aliased areas. This problem can be improved if a better anti-aliasing technique is incorporated.

Figure 7A:
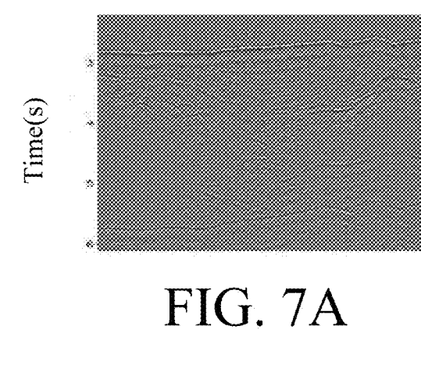
FIG. 7A shows two blended source array seismic data, FIG. 7D simulate a three-source array case.
Figure 7B:
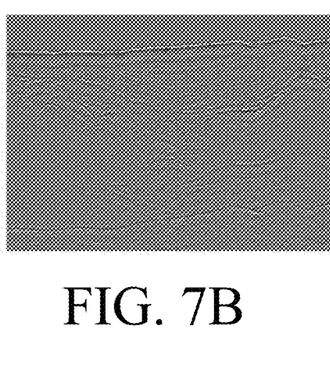
Figure 7C:
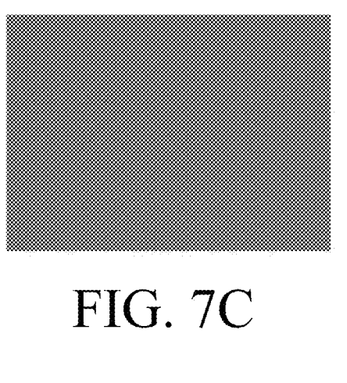
FIGS. 7C and 7F shows the deblending results for the two and three source arrays, respectively.
Figure 7D:
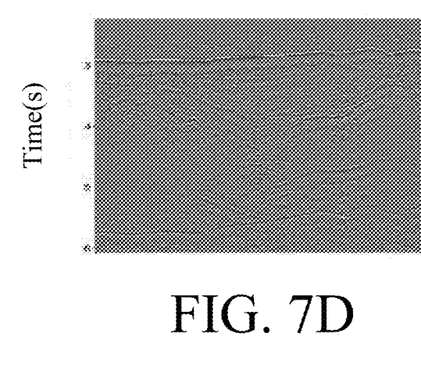
Figure 7E:
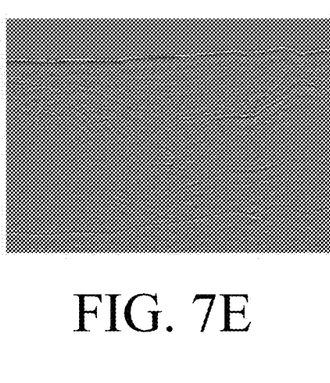
Figure 7F:
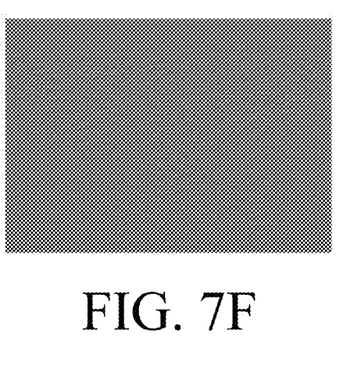

Further, the impact of the number of sources firing at the same time on the deblended data is now investigated. In addition to two blended source array seismic data as illustrated in FIG. 7A, another copy of the second source array data is shifted by a different random dithering time (maximum ±1000 ms) and is then summed with the blended data to simulate a three-source array case as illustrated in FIG. 7D. The signal-to-noise ratio is decreased with additional source arrays firing at the same time, as noted when comparing FIGS. 7B and 7E. However, deblending results for the two source arrays illustrated in FIG. 7C appear to be better than the deblending results for the three source arrays illustrated in FIG. 7F. The leakage for the three source arrays is greater because the random part in one source domain is no longer necessarily the coherent part in the other source domain.

The improvements discussed above with respect to the deblending process, not only increase the productivity of the seismic survey, but they also contribute to obtaining a more accurate image of the surveyed substrate. As is known, the better the image of the surveyed substrate, the better the chances of drilling at the correct location and finding oil and gas reservoirs with a reduced extraction price. Thus, the above-discussed embodiments improve the technological processes of finding and extracting oil and gas by simultaneously shooting source arrays during a same seismic survey.

Figure 8:
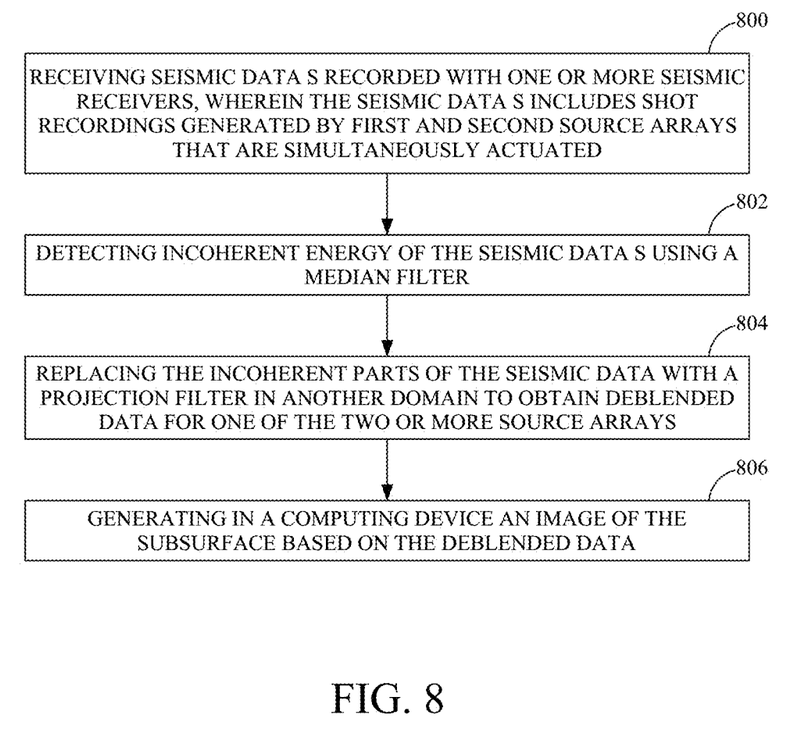
FIG. 8 is a flowchart of a method for deblending seismic data.

A method for implementing the novel features noted above is now discussed with regard to FIG. 8. According to an exemplary embodiment, a method for deblending seismic data associated with a subsurface of the earth includes a step 800 of receiving seismic data S recorded with one or more seismic receivers, wherein the seismic data S includes shot recordings generated by first and second source arrays that are simultaneously actuated, a step 802 of detecting incoherent energy of the seismic data S using a median filter, a step 804 of replacing the incoherent parts of the seismic data with a projection filter in another domain to obtain deblended data for one of the two or more source arrays, and a step 806 of generating in a computing device an image of the subsurface based on the deblended data.

Figure 9:
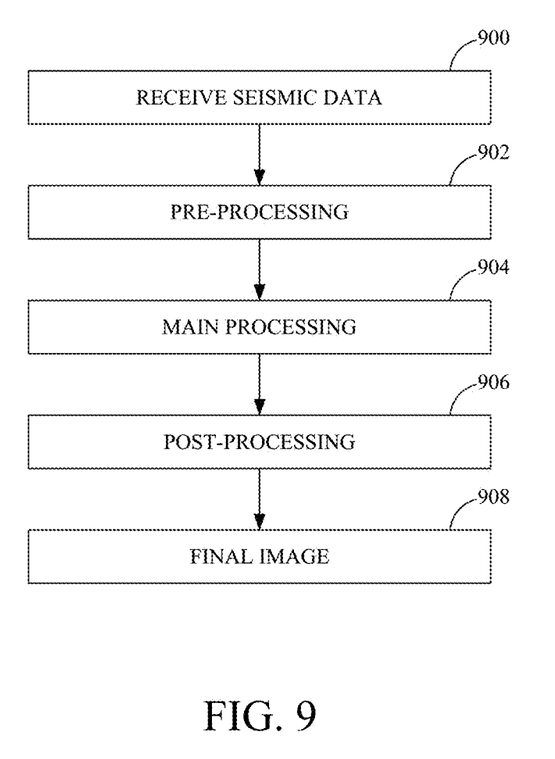
FIG. 9 is a flowchart of a method for processing seismic data.

Seismic data recorded with simultaneous shooting as discussed above may be processed in a corresponding processing device for generating an image of the surveyed subsurface as discussed now with regard to FIG. 9. For example, the seismic data collected with the characteristic noted above may be received in step 900 at the processing device. In step 902, pre-processing methods are applied, e.g., demultiple, signature deconvolution, trace summing, motion correction, vibroseis correlation, resampling, deblending as discussed with regard to FIG. 2, etc. In step 904, the main processing takes place, e.g., deconvolution, amplitude analysis, statics determination, common middle point gathering, velocity analysis, normal move-out correction, muting, trace equalization, stacking, noise rejection, amplitude equalization, etc. In step 906, final or post-processing methods are applied, e.g., migration, wavelet processing, seismic attribute estimation, inversion, etc., and in step 908 the final image of the subsurface is generated. Note that at least one process in one of steps 906 and/or 908 involves dealing with two or more seismic data sets that are blended together. Also note that a result of this processing may result in an improvement of the image of the surveyed subsurface and/or increase efficiency in acquiring the seismic data. The improved image quality will result in an increased likelihood of finding the oil and gas reservoirs.

Figure 10:
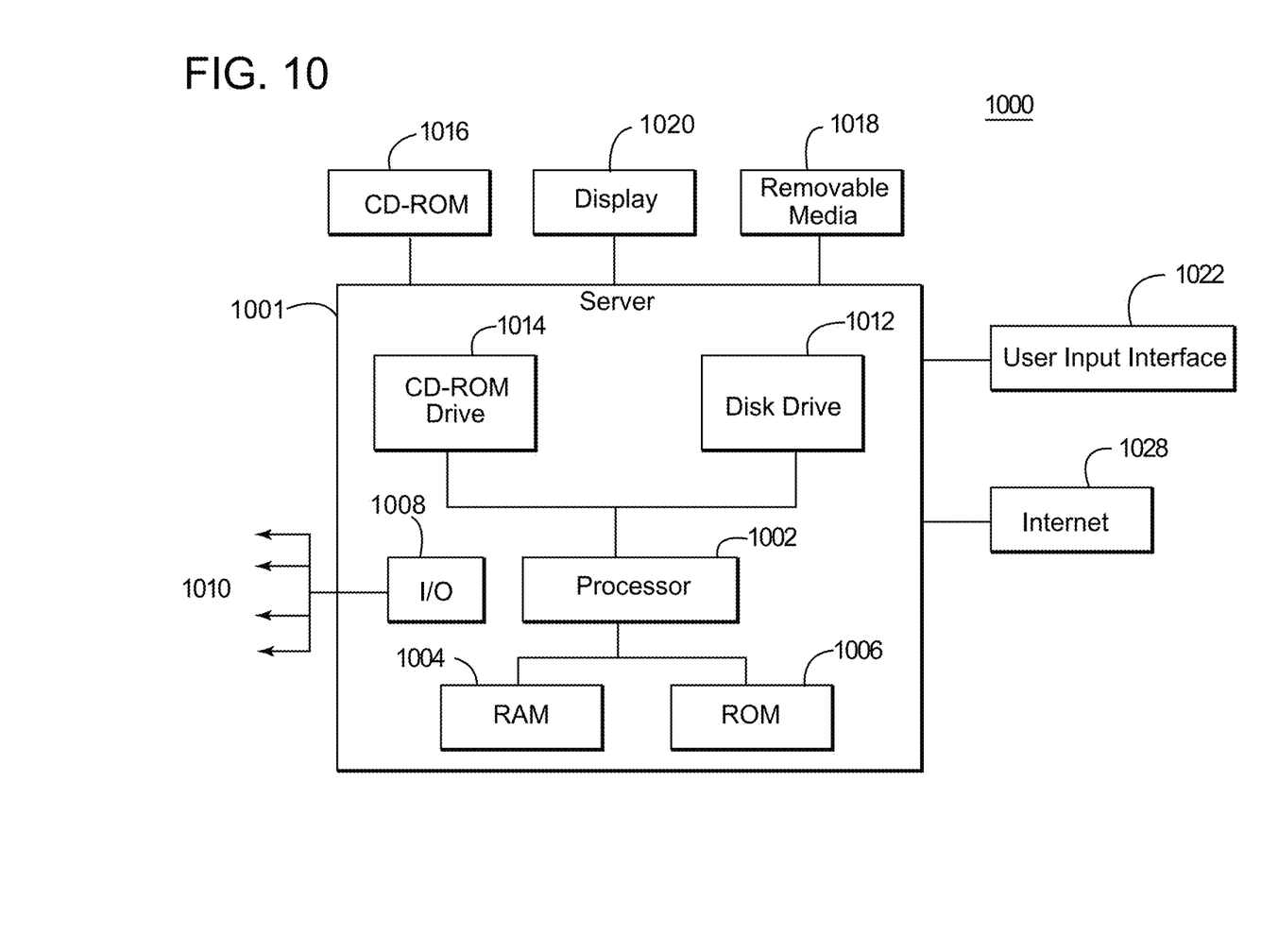
FIG. 10 is a schematic diagram of a computing device that implements a method for deblending data.

The above method and others may be implemented in a computing system specifically configured to calculate the image of the subsurface. An example of a representative computing system capable of carrying out operations in accordance with the exemplary embodiments is illustrated in FIG. 10. Hardware, firmware, software or a combination thereof may be used to perform the various steps and operations described herein.

The exemplary computing system 1000 suitable for performing the activities described in the exemplary embodiments may include a server 1001. Such a server 1001 may include a central processor (CPU) 1002 coupled to a random access memory (RAM) 1004 and to a read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like. The processor 1002 carries out a variety of functions as are known in the art, as dictated by software and/or firmware instructions.

The server 1001 may also include one or more data storage devices, including a hard drive 1012, CD-ROM drives 1014, and other hardware capable of reading and/or storing information such as DVD, etc. In one embodiment, software for carrying out the above-discussed steps may be stored and distributed on a CD- or DVD-ROM 1016, removable memory device 1018 or other form of media capable of portably storing information. These storage media may be inserted into, and read by, devices such as the CD-ROM drive 1014, the disk drive 1012, etc. The server 1001 may be coupled to a display 1020, which may be any type of known display or presentation screen, such as LCD, LED displays, plasma displays, cathode ray tubes (CRT), etc. A user input interface 1022 is provided, including one or more user interface mechanisms such as a mouse, keyboard, microphone, touchpad, touch screen, voice-recognition system, etc.

The server 1001 may be coupled to other computing devices, such as landline and/or wireless terminals via a network. The server may be part of a larger network configuration as in a global area network (GAN) such as the Internet 1028, which allows ultimate connection to various landline and/or mobile client devices. The computing device may be implemented on a vehicle that performs a land seismic survey.

The disclosed exemplary embodiments provide a system and a method for deblending recorded seismic data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for deblending seismic data associated with a subsurface of the earth, the method comprising:
receiving seismic data S recorded with one or more seismic receivers, wherein the seismic data S includes shot recordings generated by first and second source arrays that are simultaneously actuated;
detecting incoherent energy relative to the first source array in the seismic data S using a median filter;
replacing incoherent parts of the seismic data S using a projection filter to obtain deblended data for the first source array; and
generating in a computing device an image of the subsurface based on the deblended data,
wherein using the first and second source arrays simultaneously actuated reduces a time for seismic surveying the subsurface, and the image of the subsurface is useable to locate oil and gas reservoirs.

2. The method of claim 1, further comprising:
transforming the seismic data S from a time-space domain to another domain to obtain transformed seismic data d.

3. The method of claim 2, wherein the median filter is applied trace by trace to all the transformed seismic data d.

4. The method of claim 3, further comprising:
selecting a window having a certain size;
moving the window along a given trace;
for each window position, evaluating amplitudes of the given trace within the window; and
calculating a median amplitude value the median filter for the window.

5. The method of claim 4, further comprising:
removing a portion of the given trace for the first source if a corresponding median amplitude value is larger than a given threshold value.

6. The method of claim 5, further comprising:
applying the projection filter to obtain predicted seismic data for the portion of the given trace; and
replacing the portion of the given trace with the predicted seismic data to obtain the deblended data for the first source array.

7. The method of claim 1, wherein the projection filter uses interpolation for obtaining the predicted seismic data.

8. The method of claim 1, wherein the seismic data S is in the common channel domain.

9. The method of claim 1, wherein the receiving, the detecting, the replacing and the generating are stored as executable instructions on a non-transitory computer readable medium.

10. A method for deblending seismic data associated with a subsurface of the earth, the method comprising:
receiving seismic data S recorded with one or more seismic receivers, wherein the seismic data S includes shot recordings generated by source arrays that are simultaneously actuated;
for each source array i among the source arrays
detecting incoherent energy relative to the source array i in the seismic data S using a median filter $F_i$;
replacing incoherent parts of the seismic data S using a projection filter $F_i^T$ to obtain deblended data for the source array; and
generating in a computing device an image of the subsurface based on the deblended data,
wherein using the source arrays simultaneously actuated reduces a time for seismic surveying the subsurface, and the image of the subsurface is useable to locate oil and gas reservoirs
wherein filter $F_i$ outputs a remaining energy of the $i^{th}$ source array, filter $F_i^T$ outputs an impulsive noise removed part of the $i^{th}$ source and a remaining energy is a difference between an energy of the seismic data and the impulsive noise removed part.

11. The method of claim 10, wherein the filter $F_i$ is configured to transform the seismic data S from the time-space domain to the frequency-wavenumber domain, separate an aligned energy in the f-x domain, and then transform back the aligned energy to the time-space domain.

12. The method of claim 10, further comprising:
performing a first iteration of the deblended data for the first source during which the filter $F_1$ is applied to the seismic data S.

13. The method of claim 12, further comprising:
performing a second iteration of the deblended data for the first source during which the filter $F_1^T$ is applied to the seismic data S followed by the filter $F_2^T$ and this result is added at the result of the first iteration.

14. A computing device for deblending seismic data associated with a subsurface of the earth, the computing device comprising:
an interface to receive seismic data S recorded with one or more seismic receivers, wherein the seismic data S includes shot recordings generated by first and second source arrays that are simultaneously actuated; and
a processor connected to the interface and configured to
detect incoherent energy relative to the first source in the seismic data S using a median filter,
replace incoherent parts of the seismic data S using a projection filter to obtain deblended data for the first source array, and
generate an image of the subsurface based on the deblended data,
wherein using the first and second source arrays simultaneously actuated reduces a time for seismic surveying the subsurface, and the image of the subsurface is useable to locate oil and gas reservoirs.

15. The computing device of claim 14, wherein the processor is further configured to,
transform the seismic data S from a time-space domain to another domain to obtain transformed seismic data d.

16. The computing device of claim 14, wherein the median filter is applied trace by trace to all the transformed seismic data d.

17. The computing device of claim 16, wherein the processor is further configured to,
select a window having a certain size;
move the window along a given trace;
for each window position, evaluate amplitudes of the given trace within the window; and
calculate a median amplitude value the median filter for the window.

18. The computing device of claim 17, wherein the processor is further configured to,
remove a portion of the given trace for the first source if a corresponding median amplitude value is larger than a given threshold value;
apply the projection filter to obtain predicted seismic data for the portion of the given trace; and
replace the portion of the given trace with the predicted seismic data to obtain the deblended data for the first source array.

19. The computing device of claim 14, wherein the projection filter uses interpolation for obtaining the predicted seismic data.

20. The computing device of claim 14, wherein the median filter is $F_i$ and the projection filter is $F_i^T$ with i being first or second, filter $F_i$ outputting a remaining energy of the $i^{th}$ source array and filter $F_i^T$ outputting an impulsive noise removed part of the $i^{th}$ source and a remaining energy is a difference between an energy of the seismic data and the impulsive noise removed part.

* * * * *